Dec. 20, 1960   R. O. WILSON ET AL   2,965,258
BLIND RIVET PULLING TOOL
Filed March 4, 1957
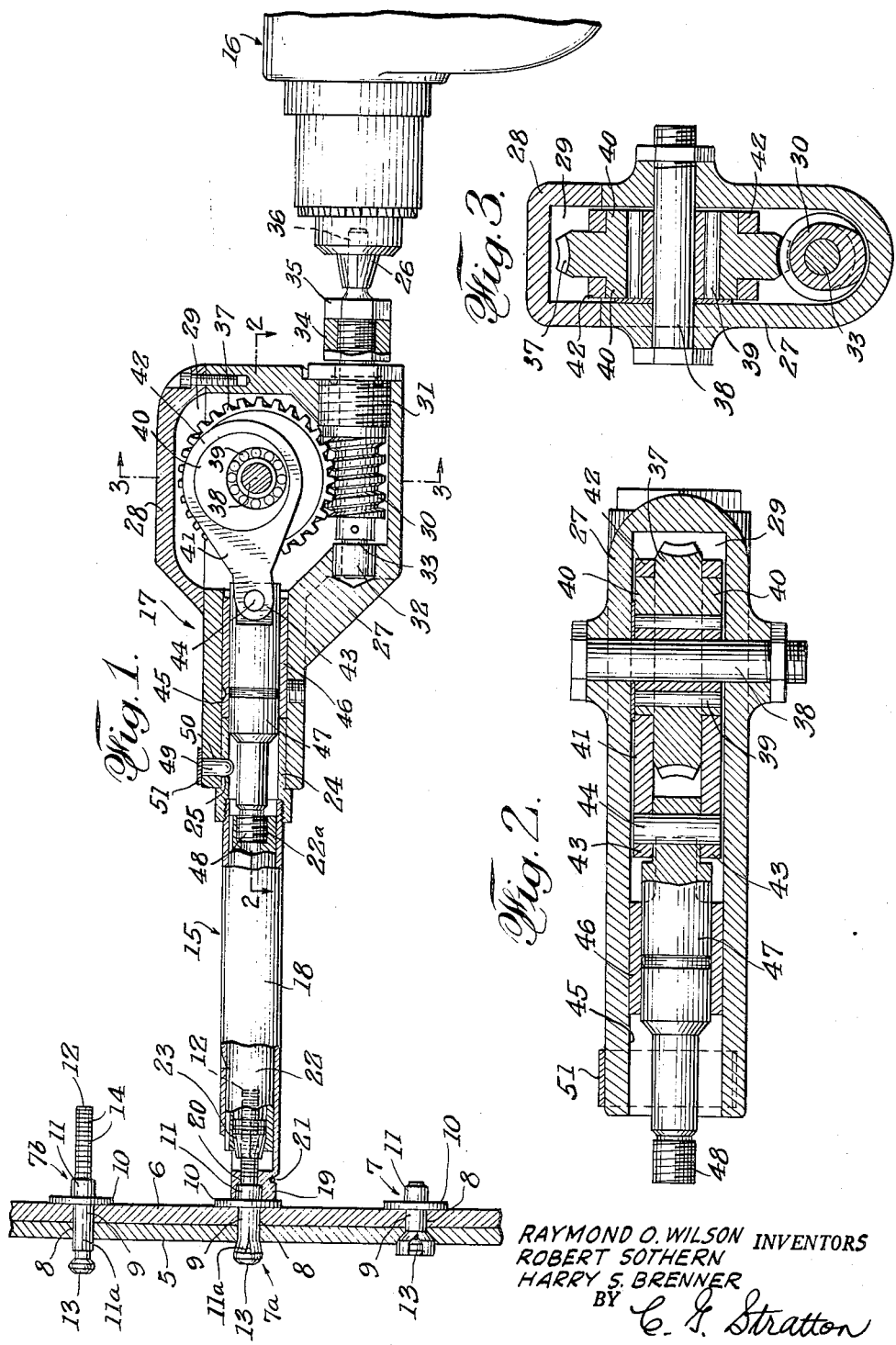
RAYMOND O. WILSON INVENTORS
ROBERT SOTHERN
HARRY S. BRENNER
BY C. S. Stratton
ATTORNEY

United States Patent Office 2,965,258
Patented Dec. 20, 1960

2,965,258
BLIND RIVET PULLING TOOL

Raymond O. Wilson, San Marino, Robert Sothern, Anaheim, and Harry S. Brenner, Los Angeles, Calif., assignors to Olympic Screw & Rivet Corporation, Downey, Calif., a corporation of California Filed Mar. 4, 1957, Ser. No. 643,718

3 Claims. (Cl. 218—42)

This invention relates to a tool for pulling or setting blind rivets.

In order to set a blind rivet, a stem or shank on the accessible side is pulled to first, spread the rivet on the non-accessible or blind side, and then attenuate or elongate said shank until the same breaks away, leaving the rivet permanently set. Pneumatic tools are at present used to hold the rivet body in place and to apply pulling and stretching forces on the shank as a series of intermittent pulls that are applied to portions of the shank that are progressively nearer the breakaway point thereof. In other words, a shank is pulled to the maximum of the stroke of such tool. Then a new grip is taken on the shank nearer to its line or point of severance and the shank is again pulled to the maximum of its stroke. One or more subsequent pulls on the shank, each applied to the shank nearer its severance line than the one before, may be taken until the shank is torn away from the rivet-spreading head.

The tools now in use are trigger-controlled and require an actuation of the trigger for each pull on the shank, as above indicated. Thus, the operator may find it necessary to press and release the trigger several times before the shank is severed. Such manual control is necessarily slow because the actuation must be timed with the cycle of operation of the tool. Because they are the human factors in a rivet setting operation, repeated pressings and releasings of a trigger are much slower than would be the case in a tool that is fully automatic.

Accordingly, it is an object of the present invention to provide a tool for automatically intermittently pulling the shank of a blind rivet and to repeat the same until the rivet is set and the shank severed from the head that causes spreading thereof.

Another object of the invention is to provide a tool of the character referred to that is trigger operated and which continues operation with one pull of the trigger.

A further object of the invention is to provide, in combination with a conventional blind rivet pulling head and a conventional power hand drill, an adapter that converts the rotary motion of the output shaft of said drill to reciprocative movement that, by connection to said head, reciprocates the same to automatically intermittently pull on the shank of a blind rivet to spread the latter.

The invention also has for its objects to provide such means that are positive in operation, convenient in use, easily installed in a working position and easily disconnected therefrom, economical to manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

Fig. 1 is a longitudinal sectional view of a blind rivet pulling tool according to the present invention and shown in operative position.

Fig. 2 is an enlarged longitudinal sectional view as taken on line 2—2 of Fig. 1.

Fig. 3 is a similarly enlarged cross-sectional view as taken on line 3—3 of Fig. 1.

In the drawing, Fig. 1 shows two pieces of metal 5 and 6 that are fastened by a blind rivet 7, in the process of being fastened, as 7a, by such a rivet, and provided, at 7b, with a blind rivet in the form the same as initially provided; it will be understood that the left is the blind side of said metal members 5 and 6 and that a rivet or rivets 7b are adapted to be placed in holes 8 provided for the purpose from the accessible or right side.

Each unit 7b conventionally comprises a housing 9 adapted to be entered into a rivet hole 8, the same being provided with a position-limiting flange 10 and, usually, with a forwardly extending boss 11. The housing is provided with slits 11a that enable the same to be spread. A shank or stem 12 extends through the housing and is provided with a head 13 on the blind side and with a set of parallel grooves 14 that import a roughened or toothed form to the shank. It will be realized that, with the flange 10 held firmly against the work (the open face of plate 6), when pull is exerted on shank 12 the head 13 will be pulled to spread housing 9 as indicated at 7a. Continued pull on said shank further spreads the housing and exerts such force as will sever the shank from the head. Some elongation of the shank results from such pull and the point of severance is controlled by providing the shank with a breakaway groove in such position that the severance is at or near the outer end of boss 11.

The present tool for pulling blind rivets comprises, generally, a conventional blind rivet pulling head 15 to engage each rivet to pull and, therefore, set the same, an electric prime mover 16 that is capable of being set into continuous operation and having a rotational output, and an adapter 17 interconnecting the head 15 and prime mover 16 and translating the rotary output of the latter to continuous reciprocative movment of the former.

The pulling head 15 is shown as comprising a tubular housing 18 that has an end 19 adapted to fit over the rivet boss 11 and apertured at 20 to receive the rivet shank 12. Said end 19 is provided with suitable resilient ratchet or detent means 21 that has snap-retention engagement with the shank when the end 19 is applied, in end abutment, to the exposed face of flange 10.

In the usual manner, the housing 18 is slidingly fitted with a collet 22 that terminates at its rear end in an internally threaded portion 22a. Said collet is operatively engaged with a set of collet jaws 23 that is adapted to engage over and grip the grooved stem of the rivet, the inner faces of the jaws being grooved accordingly. In practice, a rearward pull on the collet 22 causes the jaws 23 to close over a rivet stem 12 and, by being engaged with the grooves 14 of said stem, transmits such pull to the stem. A forward push on the collet both releases the jaws so they may open and moves the open jaws in the direction of the housing end 19. Now, the next rearward pull on the collet exerts a pull on the rivet stem from the new point of engagement between the jaws 23 and the stem. Continued reciprocations of the collet exert intermittent pulls on the rivet shank until the same breaks away, as above described.

The above-described pulling head is usually fitted with a retaining cap 24 that is threadedly connected to the outer end of the housing 18. Said cap is provided with one or more holes 25 in the general position shown.

The prime mover 16 is here shown as an electric hand drill that has its output shaft in the form of a chuck 26. While the same is not illustrated, it will be understood that said drill is provided with a trigger that, while held depressed, imparts continuous rotary movement to chuck 26. A pistol grip arrangement of conventional design enables grasping of the drill and easy manipulation of its trigger.

The present adapter 17 interconnects said collet 23 and chuck 26 and translates the rotary motion of the latter to a much slower and, therefore, more powerful reciprocation of the former.

The adapter 17 comprises a housing 27 that is provided with a cover 28 and is formed to have an internal chamber 29 that may be lubricant-filled. A worm 30 is disposed in the lower portion of chamber 29 and has bearing in housing 27 as by means of a bearing-provided gland 31, at one end, and a bearing 32, at the other end. Said worm is affixed to and is rotated by a drive shaft 33; a socketed end 34 of said shaft extends outwardly from said housing 27.

Said shaft end 34 may have a direct connection with chuck 26 or any other form of output of the prime mover 16. As shown, a drive adapter 35 may be connected to said shaft end and have a stem 36 that is engaged by chuck 26. Said stem is preferably polygonal or non-round to insure a non-slipping drive of the adapter 35.

A worm wheel 37 is in driving mesh with the worm 30, the same being mounted on a stud bolt 38 disposed transversely in housing 27; a needle bearing 39 is preferably provided for the worm wheel to turn on. Integrally formed on the opposite side faces of the worm wheel are aligned eccentrics 40. Thus, rapid rotation of chuck 26 causes a much slower rotation of the worm wheel and of the eccentrics 40 around the axis of bolt 38 and one that has its power multiplied.

Each eccentric 40 is fitted with a link 41 which, therefore, is given a reciprocative motion of degree according to the degree of eccentricity of eccentrics 40, each said link having a strap end 42 fitted around an eccentric and a pivot end 43. Said latter ends are connected by a pivot pin 44.

A passage 45 is provided in housing 27, the same extending outwardly from the chamber 29. A bushing 46 lines said passage, and a draw-bolt 47 has sliding bearing in said bushing and is connected at one end to pivot pin 44. The other end of the draw-bolt is diametrally reduced and terminates in a threaded end 48 which connects to the threaded portion 22a of the collet 22.

It will be seen from Fig. 1 that the retaining cap 34 of the pulling head 15 fits into passage 45 and that said head is retained by one or more pins 49 that enter a hole 50 in the adapter housing 27 and through aligned hole 25 in the retaining cap. Said pin is provided on a spring clip 51 that resiliently engages the housing around passage 45.

In use, a rivet 7b is placed, from the accessible side of the work, into a rivet hole 8, as illustrated in the upper portion of Fig. 1. The present tool is applied by placing the end 19 of the pulling head 15 against rivet flange 10 with the stem or shank 12 extending into said head. The ratchet or detent means 21 will automatically effect the mentioned snap retention of rivet and pulling head. Now, when the prime mover 16 is set into operation, the continuous rotation of the chuck 26 will be translated into repeated reciprocations of the collet 22, and successive pulls on shank 12, until the same is severed from the rivet head 13. Thus, the set rivet 7 is provided in a rapid and efficacious manner.

It will be evident that the adapter 17 may integrally embody a prime mover and be formed to have a pistol grip similar to the grip provided on power hand drills.

In other words, the means 16 and 17 may be combined in a single unit, if desired.

While the foregoing has illustrated and described what is now contemplated to be the best mode of carrying out our invention, the construction is, of course, subject to modification without departing from the spirit and scope of the invention. It is, therefore, not desired to restrict our invention to the particular form of construction illustrated and described, but to cover all modifications that may fall within the scope of the appended claims.

Having thus described our invention, what we claim and desire to secure by Letters Patent is:

1. A blind rivet pulling tool comprising, in combination, a pulling head having a reciprocative rivet shank-engaging collet comprised of jaws adapted to move between open, non-engaging, and closed, shank-engaging positions, a prime mover having a continuously rotating output shaft, and provided with a manually-controlled trigger which, when depressed, operates the mentioned shaft, and an adapter unit interconnecting said collet and output shaft and embodying means translating the rotation of the output shaft into automatically and uninterruptedly repeated reciprocations of the shank-engaging collet, said unit including means to engage the collet and move the same from open position to shank-engaging position.

2. A blind rivet pulling tool comprising, in combination, a pulling head having a reciprocative rivet shank-engaging collet comprised of jaws adapted to move between open, non-engaging, and closed, shank-engaging positions, a prime mover having a continuously rotating output shaft, and provided with a manually-controlled trigger which, when depressed, operates the mentioned shaft, and an adapter unit interconnecting said collet and output shaft and embodying means translating the rotation of the output shaft into repeated reciprocations of the shank-engaging collet, said unit including means to engage the collet and move the same from open position to shank-engaging position, said means including worm and worm gear means, a housing surrounding said worm and gear means, said worm being fixed rotatably in said housing, the rotation of the output shaft being translated into slower and more powerful automatically and uninterruptedly repeated reciprocations of the shank-engaging collet.

3. In a blind rivet pulling tool, a housing end apertured to receive the rivet-setting shank of a blind rivet and adapted to have end engagement with a position-limiting flange on the rivet, a tubular housing part extending from said housing end, an elongated collet slidingly fitted in said housing part and having an end adapted to be reciprocated to move the collet longitudinally toward and from the apertured end of the housing, a conical seat in the other end of the collet, a set of jaws carried by said collet and adapted to be engaged by said conical seat to contract around and grip said rivet-setting shank during movement of the collet away from the apertured housing end, said jaws automatically separating to release the mentioned shank during movement of the collet toward the apertured housing end, a prime mover having a continuously rotating output shaft, and means interconnecting said first-mentioned end of the collet and said output shaft and embodying means translating the rotation of the shaft into automatically and uninterruptedly repeated reciprocations of said collet.

References Cited in the file of this patent

UNITED STATES PATENTS

| | | |
|---|---|---|
| 2,075,162 | Begg | Mar. 30, 1937 |
| 2,384,434 | Bettington | Sept. 11, 1945 |
| 2,406,949 | Huck | Sept. 3, 1946 |
| 2,582,417 | Croessant | Jan. 15, 1952 |
| 2,717,714 | Haley | Sept. 13, 1955 |
| 2,753,072 | Mitchell | July 5, 1956 |